(12) United States Patent
Manjunath

(10) Patent No.: US 6,332,216 B1
(45) Date of Patent: Dec. 18, 2001

(54) HYBRID JUST-IN-TIME COMPILER THAT CONSUMES MINIMAL RESOURCE

(75) Inventor: Geetha Manjunath, Bangalore (IN)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/264,755

(22) Filed: Mar. 9, 1999

(51) Int. Cl.$^7$ .................................................. G06F 9/45
(52) U.S. Cl. ........................................ 717/5; 717/6; 717/7
(58) Field of Search ................... 717/5, 6, 7, 8, 717/9; 703/23, 24; 707/4

(56) References Cited

U.S. PATENT DOCUMENTS

| | | | |
|---|---|---|---|
| 5,367,685 | * | 11/1994 | Gosling ..................................... 717/7 |
| 5,583,983 | * | 12/1996 | Schmitter .................................. 717/5 |
| 5,768,593 | * | 6/1998 | Walters et al. ............................ 717/5 |
| 5,933,144 | * | 8/1999 | Alcorn .................................. 345/347 |
| 5,974,256 | * | 10/1999 | Matthews et al. ........................ 717/5 |
| 6,003,050 | * | 12/1999 | Silver et al. ........................... 707/536 |
| 6,066,181 | * | 5/2000 | Demaster .................................. 717/5 |
| 6,075,942 | * | 6/2000 | Cartwright, Jr. ......................... 717/9 |
| 6,081,665 | * | 6/2000 | Nilsen et al. ............................. 717/5 |
| 6,110,226 | * | 8/2000 | Bother ...................................... 717/7 |
| 6,128,011 | * | 10/2000 | Peng .................................... 345/335 |
| 6,139,199 | * | 10/2000 | Rodriguez ................................ 717/9 |
| 6,141,794 | * | 10/2000 | Dice et al. ................................ 717/5 |
| 6,151,703 | * | 11/2000 | Crelier ...................................... 717/5 |
| 6,158,048 | * | 12/2000 | Luch et al. ................................ 717/9 |
| 6,170,083 | * | 1/2001 | Adl Tabatabai .......................... 717/9 |
| 6,205,578 | * | 3/2001 | Grove ........................................ 717/5 |
| 6,237,135 | * | 5/2001 | Timbol ...................................... 717/1 |

OTHER PUBLICATIONS

Gough, "Parameter passing for a Java virtual machine", IEEE, pp 1–7, 1999.*
Hua et al, "Platform independence issues in compiling java bytecode to native code", IEEE, pp 530–532, Feb. 2000.*
Weimin et al, "A java virtual machine design based on hybrid concurrent compilation model", IEEE, pp 18–23, Aug. 2000.*
Newhall et al, "Performance measurement of dynamically compiled java execution", ACM JAVA, pp 42–50, May 1999.*
Benton et al., "Compling standard ML to Java bytecodes", ACM ICFP, pp 129–140, Apr. 1998.*
Ishizaki et al, "Design, implementation and eveluation of optimizations in a Just in time compiler", ACM Java, pp 119–128, May 1999.*
Maassen et al., "An efficient implemenation of Java remote method invocation", PPoPP ACM, pp 173–182, Mar. 1999.*
Azevedo et al., "Java annotation awarw just in time (AJIT) compilation system", ACM Java, pp 142–151, May 1999.*

* cited by examiner

Primary Examiner—Kakali Chaki
Assistant Examiner—Anil Khatri

(57) ABSTRACT

A virtual machine with a hybrid just-in-time compiler that enables execution of a set of cross-platform code on a hardware platform. The hybrid just-in-time compiler consumes relatively few resources of the hardware platform by compiling only selected basic blocks of the cross-platform code and by making use of existing elements in the virtual machine that are otherwise used to interpret the cross-platform code. The just-in-time compiler is hybrid in that only selected basic blocks of the cross-platform code are compiled while the remaining portions are interpreted.

18 Claims, 2 Drawing Sheets

HYBRID JUST-IN-TIME COMPILER THAT CONSUMES MINIMAL RESOURCE

BACKGROUND OF THE INVENTION

1. Field of Invention

The present invention pertains to the field of processing systems. More particularly, this invention relates to a hybrid just-in-time compiler that consumes minimal resources.

2. Art Background

Computer systems and devices having embedded processing resources typically conform to one of a variety of differing architectures. Each architecture is usually defined by a particular instruction set, hardware register set, and memory arrangement, etc. An architecture may also be referred to as a hardware platform for software execution. Software such as application programs which are written or compiled to be executed on a particular hardware platform may be referred to as native code. An application program in the native code of a particular hardware platform usually does not run on other non compatible hardware platforms.

Some software environments enable application programs to execute on a variety of differing hardware platforms. The application programs which execute under such a software environment usually take the form of a stream of instructions each of which conforms to a predefined instruction set supported by the software environment. Such a software environment typically interprets each of the instructions in the stream and provides emulation of the instructions in the native code of the particular hardware platform. The software environment itself may take the form of a virtual machine which executes in native code.

One example of such a software environment is a Java virtual machine. A typical Java virtual machine functions as an interpreter for Java application programs. A Java application program typically take the form of a stream of Java byte code instructions and the Java virtual machine emulates each Java byte code instruction using the native code of the particular hardware platform under which the Java virtual machine executes. Unfortunately, this type of emulation usually yields severely reduced instruction execution performance in comparison to application programs which are in native code.

One prior method for improving the instruction execution performance in such a software environment is to provide the software environment with what may be referred to as a just-in-time compiler. A typical just-in-time compiler is a process that compiles an application program into native code. A just-in-time compiler may execute concurrently or sequentially with the virtual machine process that interprets the application program. A just-in-time compiler typically generates a native code version of an application program which is thereafter available for execution if the application program is subsequently run. Unfortunately, prior just-in-time compilers typically consume large amounts of resources such as memory and processor cycles and are therefore not well suited for devices having relatively limited resources.

SUMMARY OF THE INVENTION

A virtual machine with a hybrid just-in-time compiler is disclosed that enables execution of a set of cross-platform code on a hardware platform. In contrast to prior just-in-time compilers, the just-in-time compiler disclosed herein consumes relatively few resources of the hardware platform by compiling only selected basic blocks of the cross-platform code and by making use of existing elements in the virtual machine that are otherwise used to interpret the cross-platform code. The just-in-time compiler is hybrid in that only selected basic blocks of the cross-platform code are compiled while the remaining portions are interpreted.

In one embodiment, the virtual machine with a hybrid just-in-time compiler includes a code generator that compiles a selected basic block of the cross-platform code into a native code block for the hardware platform. The virtual machine in this embodiment further includes an interpreter that executes the cross-platform code by executing the native code block in place of the selected basic block and by interpreting a remaining portion of the cross-platform code. An existing action table used by the interpreter is also used by code generator to compile the native code block.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
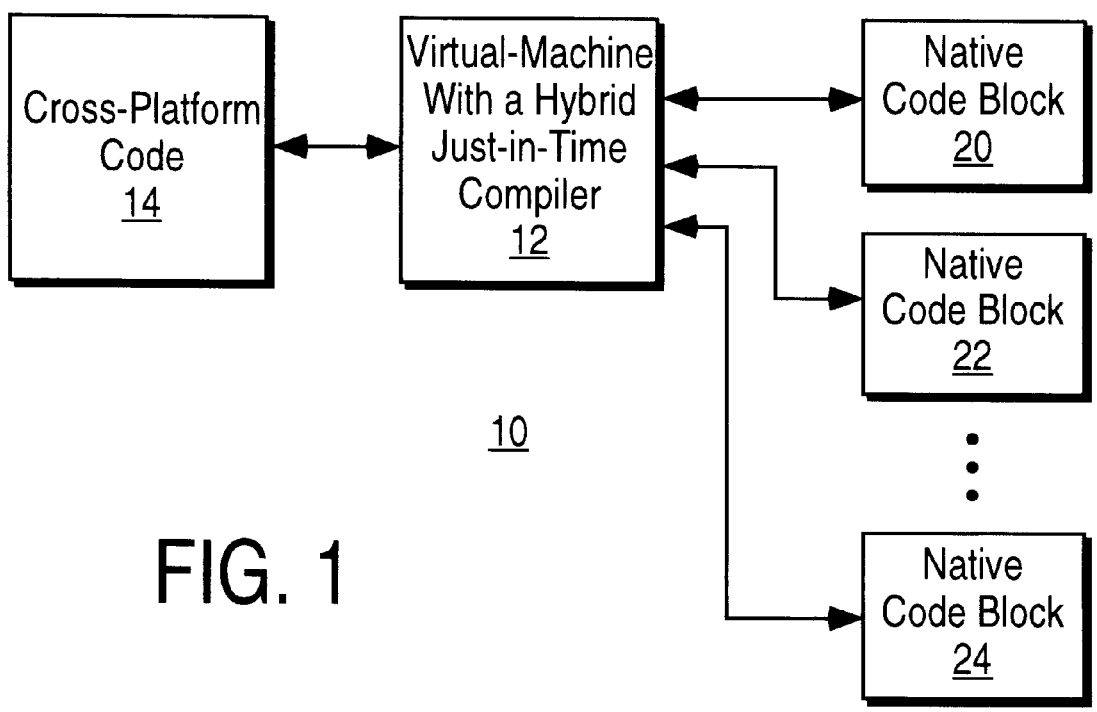
FIG. 1 shows a device that includes a virtual machine with a hybrid just-in-time compiler according to the present teachings.

FIG. 1 shows a device 10 that includes a virtual machine 12 with a hybrid just-in-time compiler according to the present teachings. The virtual machine 12 enables execution of a set of cross-platform code 14 on the particular hardware platform with which the device 10 is implemented. The virtual machine 12 interprets the cross-platform code 14 and compiles selected portions of the cross-platform code 14 to improve instruction execution performance while minimizing the amount of resources of the device 10 that are consumed by compilation.

The cross-platform code 14 represents any software which may be executed on a hardware platform that provides a suitable virtual machine environment for interpreting the instruction contained therein. The cross-platform code 14 may be an application program or a loadable class file or an individual function or method. In one embodiment, the cross-platform code 14 is an application program in Java byte code and the virtual machine 12 is a Java virtual machine.

In the following description, the cross-platform code 14 is treated as Java byte code and the virtual machine 12 as a Java virtual machine. It is apparent, however, that the present techniques may be readily applied to other programming languages that enable cross-platform execution.

The virtual machine 12 partially interprets and partially compiles methods, routines or functions that may be included in the cross-platform code 14. Initially, the virtual machine 12 executes the cross-platform code 14 by interpreting each byte code instruction contained therein. In addition, the virtual machine 12 detects one or more basic blocks in the cross-platform code 14 that are suitable for compilation. The virtual machine 12 compiles these basic blocks to provide a set of native code blocks 20–24 each of which is in the native code for the particular hardware platform provided in the device 10. Once the native code blocks 20–24 have been compiled, the virtual machine 12 executes the cross-platform code 14 by executing the native code blocks 20–24 where appropriate and by interpreting the remaining portions of the cross-platform code 14.

It is a well known rule of thumb that most programs spend more than 80 percent of execution time on less than 20 percent of their code. It is therefore not necessary to compile and entire application programs or entire methods as is done in the prior art to gain speed of execution. It is sufficient to compile only the portions of the methods, routines, or functions that are heavily executed. Consider the case of a method that spends most of its execution time in a small loop that is executed 10000 times. The hybrid just-in-time compiler functionality implemented in the virtual machine 12 compiles only this loop and the remainder of the method is interpreted during execution of the method.

The following is example Java source code which corresponds to the cross-platform code 14. This example is a method that calculates the dot product of two vectors.

Example Source Code for the Cross-Platform Code

```
void loopit(){
    double a[], b[];
    int i;
    double sum = 0.0;
        Date dl= new date();
        a = new double[count];
        b = new double[count];
        for (i=0; i< count; i++)
            a[i] = b[i] = 10.0;
        for (i=0; i< count; i++)
            Sum = a[i]*b[i]+sum;
        Date d2= new Date();
        long 11 = d1.getTime();
        long 12 = d2.getTime();
        12 = 12-11;
        System.out.println("Time ="+ 12);
}
```

The cross-platform code 14 corresponding to this example Java source code consists of approximately 136 Java byte code instructions. The highlighted for-loop shown above in this example Java source code consists about 15 Java byte code instructions as set forth below.

Example Basic Block 57 aload_1
58 iload_3
59 daload
60 aload_2
61 iload_3
62 daload
63 dmul
64 dload 4
66 dadd
67 dstore 4
69 iinc 31
72 iload_3
73 aload _0
74 getfield #14 <Field Dot.count I>
77 if_icmplt 57

A compilation of the highlighted for-loop as a basic block, 15 out of 136 byte code instructions in the method, will eliminate approximately 89 percent of the compilation work in comparison to prior just-in-time compilers that compile entire methods or entire programs. This greatly reduces the resources that are needed in the device 10 to perform compilation.

Moreover, the large majority of execution time for this example method is spent on the basic blocks that are compiled into native code by the hybrid just-in-time compiler functionality of the virtual machine 12, i.e. the two for-loops. The remainder of the byte code instructions of the example method are executed only once per execution of the method. This yields greatly enhanced instruction execution performance with minimal compilation effort.

Figure 2:
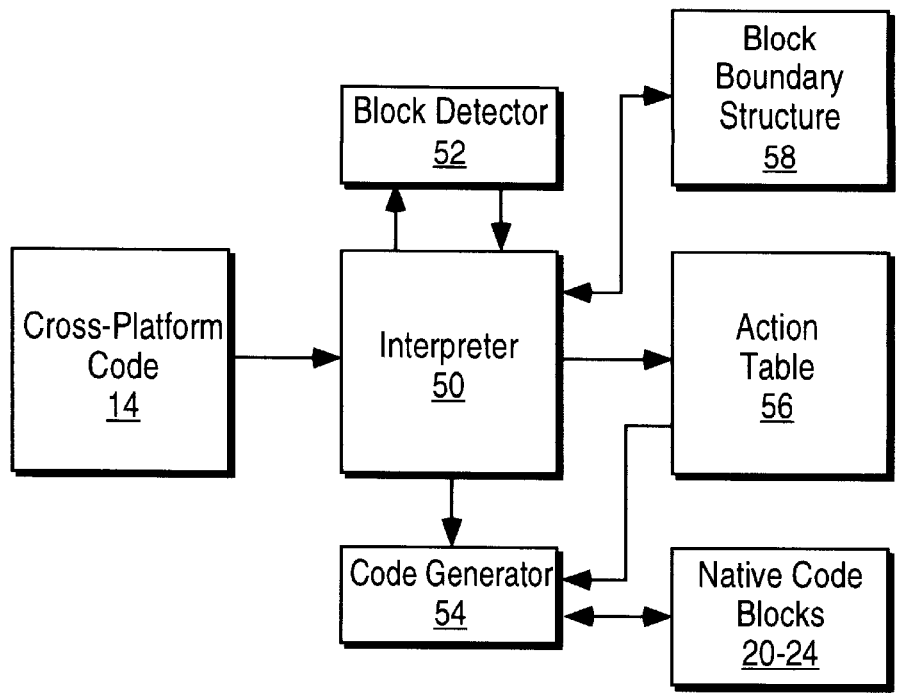
FIG. 2 shows one arrangement of a just-in-time compiler in the virtual machine.

FIG. 2 shows one arrangement of a just-in-time compiler in the virtual machine 12. The virtual machine 12 includes an interpreter 50 that fetches the cross-platform code 14 and interprets each byte code instruction contained therein in sequence. In this context, the interpreter 50 may be characterized as an extremely large switch statement with case values being the opcodes of the instruction set supported by the virtual machine 12.

The interpreter 50 accesses an action table 56 while interpreting the byte code instructions. The action table 56 associates each byte code instruction that may be contained in the cross-platform code 14, i.e. each Java opcode, to a set of action code. Each set of action code is a set of native code instructions that will perform the appropriate operations for emulating the corresponding Java opcode.

When the cross-platform code 14 is invoked for the second time, the interpreter 50 calls a block detector 52. In other embodiments, the block detector 52 may be called after the third or fourth, etc., time that the cross-platform code 14 is invoked or some other condition. The block detector 52 identifies the basic blocks in the cross-platform code 14 that are to be compiled. One example of a basic block identified by the block detector 52 is a for-loop as previously discussed. Other examples of basic blocks that may be suitable for compilation include function calls or method calls that are executed a large number of times.

The block detector 52 creates a block boundary structure 58 which is a data structure that marks the boundaries of the basic blocks in the cross-platform code 14 that are suitable for compilation. In the example method shown above, the basic blocks suitable for compilation are the byte code blocks corresponding to the for-loops shown in the source code. For example, the block boundary structure 58 lists the boundaries 57 and 77 of the highlighted for-loop. After the boundaries of the basic blocks have been identified, the interpreter 50 fetches and interprets each byte code instruction in the cross-platform code 14 while using the block boundary structure 58 to determine when it reaches a basic block that is suitable for compilation. When one of the basic blocks is encountered, the interpreter 50 invokes a code generator 54.

The code generator 54 obtains the basic block from the interpreter 50 and generates a corresponding native code block 20–24. For example, the code generator 54 obtains byte code instructions 57–77 shown above and in response generates the native code block 20. In one embodiment, the code generator 54 overwrites the basic block in the cross-platform code 14 with a reference to the native code block 20 so that the native code block 20 is executed the next time that the cross-platform code 14 is executed and the basic block is encountered.

Figure 3:
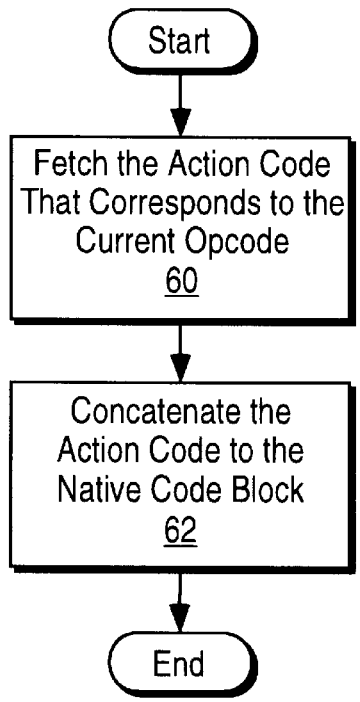
FIG. 3 shows a procedure used by the code generator to compile a basic block of the cross-platform code.

FIG. 3 shows a procedure used by the code generator 54 to compile a basic block of the cross-platform code 14. The code generator 54 performs steps 60–62 for each bye code instruction of a basic block such as the example byte code instructions 57–77 shown above.

At step 60, the code generator 54 fetches a set of action code that corresponds to the opcode of the current byte code instruction being compiled. In one embodiment, the action code is a set of native code instructions which are obtained from the action table 56. In this manner, the code generator 54 makes use of existing elements in the virtual machine 12 that are otherwise used to interpret the cross-platform code 14. This avoids the need for additional elements, and the resources they consume, as is the case in prior just-in-time compilers.

For example, assume that the action table 56 contains the following contents.

Example Action Table

| Opcode 1 | native code instructions A |
| Opcode 2 | native code instructions B |
| Opcode 3 | native code instructions C |
| Opcode 4 | native code instructions D |

Assume also that opcode 1 corresponds to the aload byte code instruction and that opcode 4 coresponds to the iload byte code instruction and that opcode 2 corresponds to the daload byte code instruction. When the code generator 54 encounters an aload instruction at step 60 it obtains native code instructions A from the action table 56 as the action code. Similarly, when the code generator 54 encounters an iload instruction at step 60 it obtains native code instructions D from the action table 56 and so on. Although only four entries are shown, the action table 56 actually contains a set of native code instructions for each of the possible opcodes in the applicable instruction set which in this example is Java byte code.

At step 62, the code generator 54 concatenates the obtained action code to the native code block 20. For the example basic block shown above, the native code block 20 is as follows after step 62 on byte code instruction 57.

| Native Code Block |
| --- |
| native code instructions A |

After step 62 on byte code instruction 58, the native code block 20 is as follows.

| Native Code Block |
| --- |
| native code instructions A |
| native code instructions D |

After step 62 on byte code instruction 58, the native code block 20 is as follows.

| Native Code Block |
| --- |
| native code instructions A |
| native code instructions D |
| native code instructions B |

The native code block 20 may also include an appropriate set of prologue instructions and an appropriate set of epilogue instructions.

After completion of steps 60–62 on each byte code instruction in the basic block, the code generator 54 may perform an optimization on the native code block 20. For example, a peephole optimization may be performed. It may be preferable to employ a pattern-driven peephole optimizer to improve portability. The peephole optimization may be repeated multiple times with bigger window sizes used to optimized blocks in methods that are more frequently invoked. This provides an incremental optimization technique.

The virtual machine 12 with a hybrid just-in-time compiler is advantageous in devices having relatively limited resources. This may include devices with relatively little or no file system resources and or minimal memory resources and or limited processor resources. Such a device may be an embedded system. Examples of embedded systems include telephones, audio and video equipment, home appliances, and computer peripherals.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A virtual machine that enables execution of a set of cross-platform code on a hardware platform, comprising:
    block detector that identifies a basic block contained in the cross-platform code which is to be compiled into a native code block for the hardware platform;
    code generator that compiles the basic block into the native code block in response to the identification from the block detector;
    interpreter that executes the cross-platform code by executing the native code block in place of the basic block and by interpreting a remaining portion of the cross-platform code not identified by the block detector.

2. The virtual machine of claim 1, wherein the block detector identifies the basic block by identifying a program loop in a method contained in the cross-platform code.

3. The virtual machine of claim 1, wherein the block detector identifies the basic block by identifying a method which is invoked multiple times in the cross-platform code.

4. The virtual machine of claim 1, wherein the block detector identifies the basic block by identifying a function which is invoked multiple times in the cross-platform code.

5. The virtual machine of claim 1, wherein the code generator generates the native code block in response to a table used by the interpreter for associating each of a set of opcodes which may be used in the cross-platform code to a corresponding action code in terms of a native code of the hardware platform.

6. The virtual machine of claim 1, wherein the code generator optimizes the native code block.

7. The virtual machine of claim 1, wherein the block detector identifies the basic block by identifying a set of boundaries of the basic block in the cross-platform code.

8. The virtual machine of claim 7, wherein the code generator compiles the basic block in response to the boundaries.

9. A method for execution of a set of cross-platform code on a hardware platform, comprising the steps of:
    identifying a basic block contained in the cross-platform code which is to be compiled into a native code block for the hardware platform;
    compiling the basic block into the native code block in response to the identification;

executing the cross-platform code by executing the native code block in place of the basic block and by interpreting a remaining portion of the cross-platform code not identified for compilation.

10. The method of claim 9, wherein the step of identifying a basic block comprises the step of identifying a program loop in a method contained in the cross-platform code.

11. The method of claim 9, wherein the step of identifying a basic block comprises the step of identifying a method which is invoked multiple times in the cross-platform code.

12. The method of claim 9, wherein the step of identifying a basic block comprises the step of identifying a function which is invoked multiple times in the cross-platform code.

13. The method of claim 9, wherein the step of compiling the basic block comprises the step of generating the native code block in response to a table for associating each of a set of opcodes which may be used in the cross-platform code to a corresponding action code in terms of a native code of the hardware platform.

14. The method of claim 9, further comprising the step of optimizing the native code block.

15. The method of claim 9, wherein the step of identifying a basic block includes the step of determining a set of boundaries of the basic block in the cross-platform code.

16. The method of claim 15, wherein the step of compiling the basic block includes the step of compiling the basic block in response to the boundaries.

17. The method of claim 9, wherein the step of identifying a basic block includes the step of determining a set of boundaries for each of a set of additional basic blocks in the cross-platform code.

18. The method of claim 17, further comprising the step of compiling the additional basic block in response to the boundaries.

* * * * *